Aug. 8, 1939.          J. A. HASSAN           2,168,602
              RADIO-CONTROLLED SIGNALING MEANS
                    Filed Oct. 26, 1937

Inventor
Joseph A. Hassan
By Harold E. Cole
        Attorney

Patented Aug. 8, 1939

2,168,602

UNITED STATES PATENT OFFICE 2,168,602

RADIO-CONTROLLED SIGNALING MEANS

Joseph A. Hassan, Quincy, Mass., assignor of one-half to William F. McIntyre, Quincy, Mass.

Application October 26, 1937, Serial No. 171,089

1 Claim. (Cl. 250—2)

This invention relates to a radio-controlled signal for vehicles or stations, and more especially to a signal light adapted to be lighted by merely broadcasting from a central station to a radio receiving set in a police cruiser car or other place.

The principal object of my invention is to provide means for an automobile, station or home having a radio receiving set, which will light a signal light upon receipt of a radio message from headquarters when the person who should receive the radio message is away from the radio receiving set.

Oftentimes an officier who operates a police cruiser automobile is obliged to leave the car to direct traffic, or to make an investigation on foot, or for some other reason, in which event he cannot receive any message transmitted from headquarters to his radio receiving set in the car, nor is there any means at present for informing him that headquarters is trying to communicate with him. With my device connected to his radio receiving set in the car the mere broadcasting of a message from headquarters will light a signal light on the outside of the car which is visible for a very considerable disance in all directions from the car, thus informing the officer that headquarters has a message for him, whereupon he can immediately return to the car and listen to the message.

One object has been to provide signaling means so simple to operate, that an electrical circuit from the radio to the signal light may be established by merely throwing a switch. Another object has been to provide such means that may be quickly installed as an accessory in the automobiles already in use, by merely connecting it with a certain part of the radio and installing a signal, such as a light, on the outside of the car and providing wires to establish an electrical circuit to said light and return, with a switch at a convenient place to open and close the said circuit to the light. Another object is to so construct my device that it can be made wholly of standard, or stock and inexpensive parts that are easily assembled together and installed.

The foregoing and other objects which will appear as the nature of the invention is better understood, may be accomplished by a construction, combination and operative arrangement of parts such as is disclosed by the drawing and specification. The nature of the invention is such as to render it susceptible to various changes and modifications, and, therefore, I am not to be limited to said disclosure; but am entitled to all such change therefrom as fall within the scope of my claim.

Figure 1:
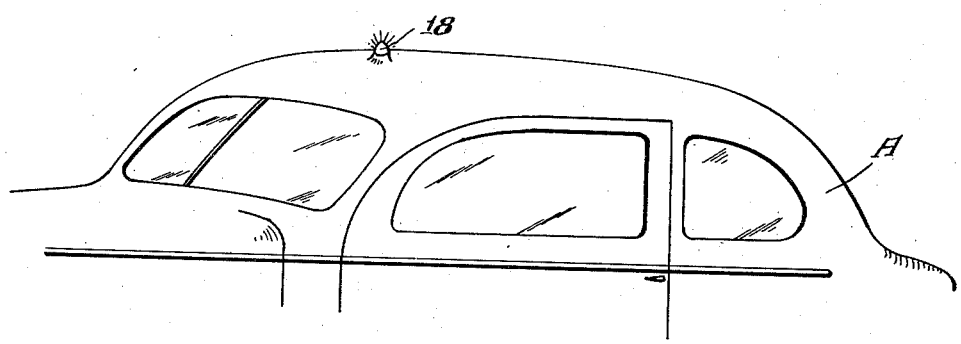
Figure 1 is a perspective, partial view of the upper portion of an automobile, showing the signal light extending above the top of the automobile.
Figure 2:
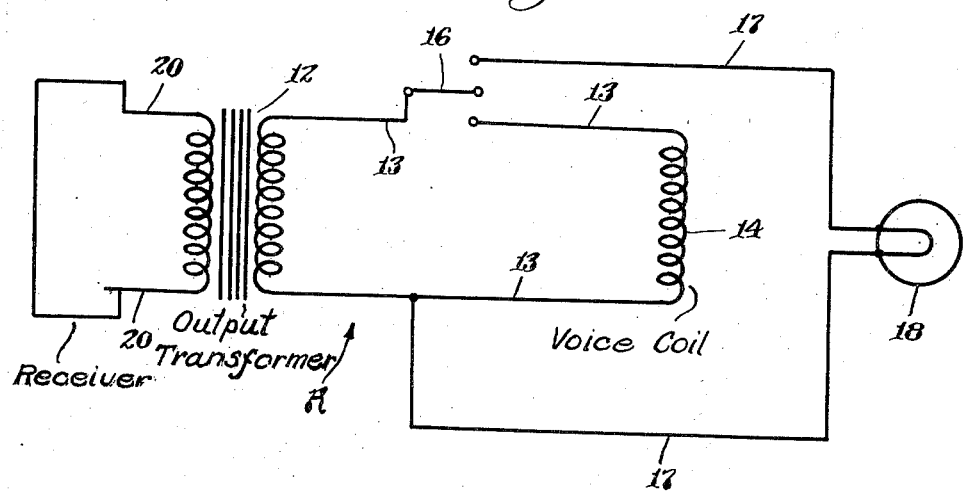
Figure 2 is a diagrammatic view of my device showing the electrical circuits, switch and signal light, the switch being in neutral position and the circuits open.

As illustrated, the automobile A which, in using my device, would often be a police cruiser car, is equipped with a radio receiving set R of well known make in the interior of said car, having an output transformer 12, which may be of any commonly known type, for long or short waves. Wiring or other electrical transmitting means 13 extends from said transformer 12 to a voice coil 14 such as is commonly used in radios. The voice coil circuit is usually the last circuit in a radio. The electrical circuit established through this voice coil wiring 13 may be opened by throwing off a movable switch 16 installed at an intermediate point of said wiring 13 between said transformer 12 and said voice coil 14. This switch 16 is shown in a neutral position in Figure 2 of the drawing. In an automobile it would ordinarily be mounted on the dash board.

The signal circuit is established by other wiring 17 which extends from a point adjacent said switch 16 to a signal light, and thence to a part of said voice coil wiring 13, which part preferably extends uninterruptedly from said voice coil 14 to said transformer 12. Said switch 16 may be moved into or out of electrical connection with said signal circuit wiring 17 as desired.

Said signal light 18 may be mounted on an automobile, preferably outside and at the highest part of the top, where it will be visible for some distance away. From said radio R wires 20 extend to any source of power such as a battery in the automobile, or an outside source of current.

In place of an automobile said signal 20 might be installed at an airport station or in a home or other place.

Ordinarily said switch 16 will be in such position that the usual radio circuit from the said transformer 12 to said voice coil 14 will be established; but in case the person to receive the radio message leaves his place near the radio, he will move the switch into contact with said signal wiring 17 to thereby establish an electrical circuit to said signal light 18, wherefore any message broadcasted from headquarters intended for said person will light said signal 18. Of course, special signaling means, which are commonly used at police stations, may be operated to light said signal 18 instead of speaking into the transmitter at headquarters.

What I claim is:

In an automobile equipped with a radio receiver having an output transformer and a voice coil, an electric circuit including the transformer and voice coil, a manually operable double-contact switch in said circuit, said switch being located within the interior of the automobile, a signal light located on the exterior of the automobile, and a secondary electrical circuit including the signal light, connected to the switch and to the first-named circuit intermediate the transformer and the voice coil, said switch being selectively operative to close either of said circuits respectively for operating the voice coil or lighting the signal light.

JOSEPH A. HASSAN.